United States Patent
Grothe et al.

(10) Patent No.: US 8,896,546 B2
(45) Date of Patent: Nov. 25, 2014

(54) HIGH INTEGRITY TOUCH SCREEN SYSTEM

(75) Inventors: Steve Grothe, Cave Creek, AZ (US);
Joseph J. Nutaro, Phoenix, AZ (US);
James Tyrrell, Peoria, AZ (US)

(73) Assignee: Honeywell International Inc., Morristown, NJ (US)

(*) Notice: Subject to any disclaimer, the term of this patent is extended or adjusted under 35 U.S.C. 154(b) by 729 days.

(21) Appl. No.: 12/695,798

(22) Filed: Jan. 28, 2010

(65) Prior Publication Data
US 2011/0181523 A1    Jul. 28, 2011

(51) Int. Cl.
*G06F 3/041* (2006.01)
*G06F 11/16* (2006.01)

(52) U.S. Cl.
CPC .......... *G06F 3/0418* (2013.01); *G06F 11/1637* (2013.01); *G06F 11/1633* (2013.01); *G06F 2203/04106* (2013.01)
USPC ............ 345/173; 345/156; 345/174; 345/175

(58) Field of Classification Search
CPC ...................................................... G06F 11/00
USPC .......................................................... 345/173
See application file for complete search history.

(56) References Cited

U.S. PATENT DOCUMENTS

| | | | |
|---|---|---|---|
| 6,492,979 B1 | 12/2002 | Kent et al. | |
| 6,504,530 B1 * | 1/2003 | Wilson et al. | 345/173 |
| 2005/0137916 A1 * | 6/2005 | McElhannon | 705/5 |
| 2006/0279548 A1 * | 12/2006 | Geaghan | 345/173 |

FOREIGN PATENT DOCUMENTS

| | | |
|---|---|---|
| EP | 2012223 A2 | 1/2009 |
| EP | 2012223 A3 | 7/2011 |

OTHER PUBLICATIONS

EP Search Report, EP 11150350.4-2211/2360593 dated Feb. 8, 2012.
EP Communication, EP 11150350.4-2211 dated Mar. 6, 2012.

* cited by examiner

*Primary Examiner* — Jesus Hernandez
(74) *Attorney, Agent, or Firm* — Ingrassia Fisher & Lorenz P.C.

(57) ABSTRACT

A high integrity touch screen system includes, but is not limited to, a display screen, a first sensor array to detect a touch on the display screen and to generate a first set of touch position coordinates, a first processor connected to the first sensor array and configured to receive the first set of touch position coordinates, a second sensor array to detect the touch on the display screen and to generate a second set of touch position coordinates and a second processor connected to the second sensor array and configured to receive the second set of touch position coordinates. The first processor and the second processor cooperate to compare the first set of touch position coordinates with the second set of touch position coordinates and to invalidate the touch when the first set of touch position coordinates and the second set of touch position coordinates do not substantially coincide.

13 Claims, 8 Drawing Sheets

HIGH INTEGRITY TOUCH SCREEN SYSTEM

TECHNICAL FIELD

The present invention generally relates to high integrity touch screen systems and more particularly, to high integrity touch screen systems which enable an operator to issue a command with only a single action.

BACKGROUND

Touch screen systems are control systems that are commonly used to control electrical, mechanical and computer systems (hereinafter, "commanded systems"). Touch screen systems present information to an operator with a display screen that is adapted to detect a touch (e.g., physical contact or near physical contact made using a body part, a stylus, and/or a light projector (infra red, laser, etc. . . . ). The operator provides an input into a touch screen system by touching the touch sensitive screen. For example, the operator may be presented with images on the display screen that include both text and collocated or associated graphics (e.g. a textual question and closely located "yes" and "no" boxes) and the operator may input a selection into the touch screen system by using a finger to touch the graphics that corresponds with the operator's choice.

Multiple technologies are used to detect the occurrence and location of the operator's touch on the display screen or to protect against false touch indications. Some of the more common technologies include resistive, surface capacitive, projected capacitive, infrared, surface acoustic wave, acoustic pulse recognition, and camera based technologies. Each technology, while generally reliable, has an associated error rate. Accordingly, each touch screen system employing any one of these technologies may occasionally incorrectly determine the location of the operator's touch or may detect a touch at a time when the operator did not touch the touch sensitive screen.

For some uses, such as selecting a radio station on a stereo, an occasional error may be inconsequential and thus the use of a touch screen system to control a commanded system in such instances may be acceptable. For other applications, however, an error could have very serious consequences. For example, the avionics system of an aircraft in flight would require a control system that has an exceedingly low error rate because the commanded system on the aircraft may directly control the aircraft's flight performance and could therefore have a direct impact on passengers and flight crew.

The Federal Aviation Administration (hereinafter, "FAA") has ranked various aircraft functions for safety needs on a sliding scale that ranges from minor to catastrophic events. If an aircraft function failure event is deemed to be "minor", then that function may be controlled by a control system having a postulated failure rate that exceeds 1/100,000 per flight hour. If an aircraft function failure event is deemed to be "major", then that function must be controlled by a control system having a postulated failure rate that is less than 1/100,000 per flight hour. If the function failure event is deemed to be "hazardous", then that function must be controlled by a control system having a postulated failure rate that is less than 1/10,000,000 per flight hour. And if the function is deemed to be "catastrophic" failure event, then that function must be controlled by a control system having a postulated failure rate that is less than 1/1,000,000,000 per flight hour. A minor event has a slight reduction in safety margins; a major event has a significant reduction in safety margins and may result in some occupant discomfort; a hazardous event has a large reduction in safety margins and may have adverse effects upon occupants; a catastrophic event can result in conditions which prevent safe landing and loss of aircraft. Similar definitions and categories are used in other industries such as industrial control.

Failure rate has several aspects. One aspect is simply failure to operate, but where the pilot either knows equipment is nonoperational and takes appropriate action, or the system is designed such that a failure of one element results in another part of the system compensating with or without the pilot's knowledge. An example is an automatic cabin temperature controller. If this equipment fails, the pilot would know by several means, even as crude as being uncomfortable, and switch to manual control or to another controller. Or, several controllers can operate in parallel and one automatically takes over for the failure of the other without pilot interference and perhaps even without the pilot's knowledge. As used herein, the term "failure" refers to failures which are both permanent and transitory in nature. For example, a permanent failure can be the breaking of a wire or the cracking of a resistor. A transitory failure includes many conditions including, for example, radiation or radio interference changing a bit in a register, components drifting in and out of specification due to environmental conditions, or other such short term variations.

Another more concerning aspect is an equipment failure but the pilot does not know it has occurred. This is typically called in the industry an "undetected hazard" or "undetected misleading data" or similar names. This has the possibility of providing misleading data or control commands with serious results. An example is an altimeter. If it has failed such that it is showing the wrong altitude yet there is no indication to the pilot that it is operating improperly, the resulting failure condition can be catastrophic. For that reason, typically there are several independent altimeters in the cockpit which the pilot scans to verify all are registering the same altitudes, within appropriate limits, or automatic systems perform such checks alleviating some of the pilot need to constantly scan.

The term "Integrity" has two aspects in the avionics industry of which undetected hazard caused by an equipment failure is one. Another is undetected failure conditions in flight caused by errors as opposed to equipment failures. Examples of such errors are improper software coding and improper hardware design. These errors are typically referred to as "generic errors".

Accordingly, a high integrity touch screen system is required to command, or to monitor, many of the systems employed onboard an aircraft. As used herein, the term "high integrity touch screen" refers to a touch screen that has an exceedingly low undetected failure rate, whether caused by equipment failures or by errors. For, example, with reference to the aviation industry, a high integrity touch screen which can support a major event is one which has an undetected failure rate of less than 1/100,000.

In the current state of the art, the use of touch screens in avionics is predominately for actions where failures result only in no flight events, minor events or at most limited number of major events. In the current state of the art, if a higher level event must be supported that requires a higher level of integrity, then a mitigating technique is for the pilot to observe that the command from the touch screen has reached the system to be controlled, but to allow the control action to take place only after the pilot confirms the requested setting is correct. This is referred to herein as the "arm/command" approach. For example, to turn a knob to set a temperature, the controller displays the temperature requested, and if the pilot agrees that was what was input via the knob, then the pilot pushes another device (e.g. button) to execute the temperature command. Thus, both the setting device (e.g. knob with a potentiometer) and the readout device must fail in order to have the incorrect data transferred, rather than just the knob.

Assuming the setting device and the readout device are independent, then the integrity probability can be computed by multiplying together the integrity of each device. For example, assuming both are working at the start of a flight, and both devices have a hardware failure rate of $10^{-5}$, then the integrity due to a failure of hardware is $10^{-5}$ multiplied by $10^{-5}$ which improves the integrity beyond a $10^{-9}$ per flight hour failure rate.

In many cases the "arm/command" is sufficient. This general approach is also used in many non-avionic systems where integrity must be high. However, this is an awkward approach in many flight situations. For example, currently in flight decks without a touch screen, the pilot simply toggles a switch or just turns a knob to command a system with high integrity—a single pilot action. To reach high integrity, the typical approach is for the switch to have two or more independent outputs and they are read by a system designed for high integrity usually with several independent processors and conversion devices. The term "independent" as used herein refers to freedom from common failures or errors as understood in the art.

Using the touch screen "arm/execute" approach requires more pilot actions:
1. The pilot must touch the simulated switch on the screen
2. The pilot must then await for the system to display, usually on the touch panel but perhaps on another cockpit display, that the system is "armed" to the on state
3. The pilot then needs to push a button or take other action to "command" the action.

This is much more awkward than simply using a common switch. It is cumbersome, inconvenient, and time consuming And, in some flight conditions it increases the pilot workload to unacceptable levels, such as in an emergency condition as in a fire or upon takeoff or landing. Here the pilot wants to take a single rapid action, not three actions. Even in other non-emergency situations, this is very awkward, such as setting or resetting of tens of electronic circuit breakers; rather than just "pulling out" or pushing in" the breaker, the pilot needs to perform several actions for each.

Also, the overall system is complex in that the controller system needs to be designed to provide the feedback to a display and to react to an "arm" and "command" condition.

Accordingly, it is desirable to provide a high integrity touch screen system suitable for the desired probability of avoiding a specified level of safety event that is not cumbersome, inconvenient, or time consuming. Additionally, it is desirable to provide a high integrity touch screen system that is suitable for use in various high integrity aviation applications that does not require a three step process in order to transmit a command to a commanded system. Furthermore, other desirable features and characteristics of the present invention will become apparent from the subsequent detailed description of the invention and the appended claims, taken in conjunction with the accompanying drawings and this background of the invention.

BRIEF SUMMARY

Various embodiments of a high integrity touch screen system for enabling an operator to interact with a commanded system are disclosed herein. In a first non-limiting embodiment, the touch screen system includes, but is not limited to, a display screen that is configured to present information to an operator. A first sensor array is arranged proximate the display screen and is configured to detect a touch by the operator on the display screen and to generate a first set of touch position coordinates. A first processor is communicatively connected to the first sensor array and is configured to receive the first set of touch position coordinates from the first sensor array. A second sensor array is arranged proximate the display screen, the second sensor array is configured to detect the touch by the operator on the display screen and to generate a second set of touch position coordinates. A second processor is communicatively connected to the second sensor array and is configured to receive the second set of touch position coordinates from the second sensor array. In this first embodiment, the first processor and the second processor are communicatively connected to each other and the first processor and the second processor are further configured to cooperate to compare the first set of touch position coordinates with the second set of touch position coordinates and to invalidate the touch when the first set of touch position coordinates and the second set of touch position coordinates do not substantially coincide.

In a second non-limiting embodiment, a high integrity touch screen system includes, but is not limited to, a display screen that is configured to present information to an operator. A first sensor array is arranged proximate the display screen. The first sensor array is configured to detect a touch by the operator on the display screen and to generate a first set of touch position coordinates. A first processor is communicatively connected to the first sensor array and to the display screen and is configured to receive the first set of touch position coordinates from the first sensor array and to control the information presented to the operator on the display screen utilizing the first set of touch position coordinates. A second sensor array is arranged proximate the display screen. The second sensor array is configured to detect the touch by the operator on the display screen and to generate a second set of touch position coordinates. A second processor is communicatively connected to the second sensor array and to the display screen. The second processor is configured to receive the second set of touch position coordinates from the second sensor array and to monitor the information presented to the operator on the display screen. The first processor and the second processor are communicatively connected to each other and are further configured to cooperate to compare the first set of touch position coordinates with the second set of touch position coordinates and to invalidate the touch when the first set of touch position coordinates and the second set of touch position coordinates do not substantially coincide. The second processor is still further configured to invalidate the touch when the second processor determines that the information presented to the operator on the display screen is incorrect.

In a third non-limiting embodiment, a method of detecting a touch on a high integrity touch screen system includes the steps of detecting a touch on a display screen with a first sensor array, generating a first set of touch position coordinates with the first sensor array, providing the first set of touch position coordinates to a first processor, detecting the touch on the display screen with a second sensor array, generating a second set of touch position coordinates with the second sensor array, providing the second set of touch position coordinates to a second processor, comparing the first set of touch position coordinates with the second set of touch position coordinates, and invalidating the touch when the first set of touch position coordinates and the second set of touch position coordinates do not substantially coincide.

BRIEF DESCRIPTION OF THE DRAWINGS

The present invention will hereinafter be described in conjunction with the following drawing figures, wherein like numerals denote like elements.

DETAILED DESCRIPTION

Figure 1:
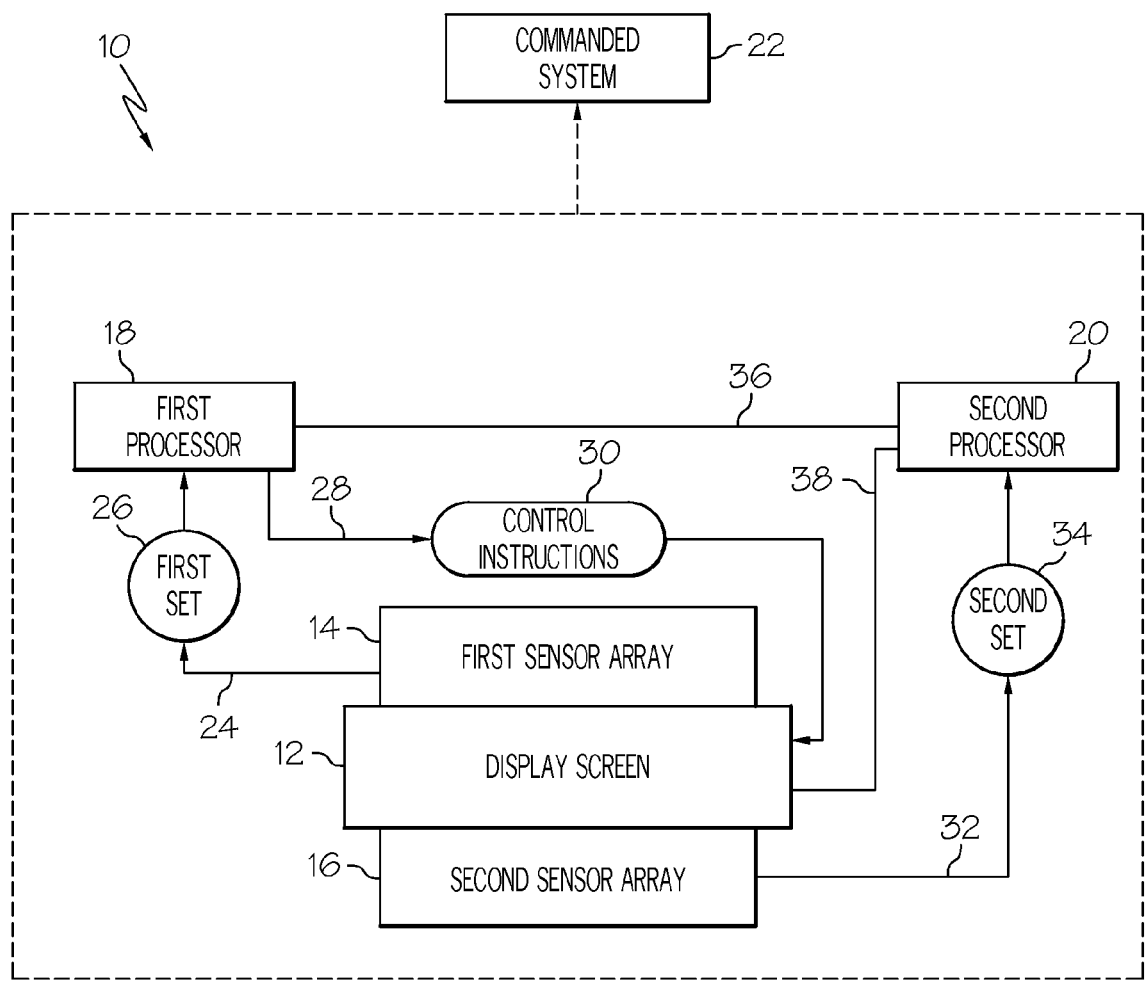
FIG. 1 is a schematic illustration of a non-limiting embodiment of a touch screen system.

The following detailed description is merely exemplary in nature and is not intended to limit the invention or the application and uses of the invention. Furthermore, there is no intention to be bound by any theory presented in the preceding background or the following detailed description.

It is desired is to advance the state of the art to have a touch panel with the integrity to allow for single actions with high integrity to control a system. That is, the pilot can command the action in a single action in a manner similar to using a switch or a knob with high integrity. This requires a touch screen and touch screen supporting electronics to form a touch function with special attributes, which is the subject of this disclosure. For high integrity situations, other touch screen implementations in the past required the "arm/command" approach. Or, if multiple sensor systems were implied, previously they assumed a single processor or operation system performing comparisons, which is not sufficient for situations that require high integrity. In addition to providing a high integrity for the touch positions, depending upon the integrity desired, the touch screen function must simultaneously provide that the screen display be what was intended. For example, simulated switches presented to the operator on the screen are all located in the same position in the proper shape and color. Various embodiments of a touch screen system that is sufficiently reliable for use in controlling commanded systems that require a high integrity controller are disclosed herein. Depending upon the embodiment selected, the invention can support the desired level of integrity.

The system includes a display screen that is configured to present an operator with information. A first sensor array is arranged proximate the display screen and is positioned and configured to detect an operator's touch on the display screen. A second, independent sensor array is also arranged proximate the display screen and is also positioned and configured to detect the operator's touch on the display screen. A first processor is communicatively connected to the first sensor array and a second processor is communicatively connected to the second sensor array. The first and the second processors are also communicatively connected to each other.

When an operator touches the display screen, the first sensor array is configured to generate a first set of touch position coordinates that reflects the location of the touch on the display screen as detected by the first sensor array. The second sensor array is configured to generate a second set of touch position coordinates that reflects the location of the touch on the display screen as detected by the second sensor array. In this manner, each touch made by an operator to the display screen results in the generation of two separate sets of touch position coordinates, each corresponding to the location of the touch on the display screen. Once generated, the first sensor array is configured to provide the first set of touch position coordinates to the first processor and the second sensor array is configured to provide the second set of touch position coordinates to the second processor.

The first processor and the second processor are each configured to cooperate with each other to compare the first set of touch position coordinates with the second set of touch position coordinates. Such cooperation may occur in myriad ways, examples of which are set forth in detail below. A variation is for both processors to get both sets of sensor data where they each compare the sensor sets within themselves as well as compare the coordinates between them. Coincide as used here-in includes both position coordinates as well as both positions occurring nearly simultaneously within reasonable limits.

If the first touch location and the second touch location coincide, then the command or input corresponding to the touch on the display screen may be delivered to the commanded system or may otherwise be executed. If the first touch location and the second touch location do not coincide, then any of a number of actions may be taken to invalidate the touch, including, but not limited to, transmitting a warning to the operator, initiating a reboot of the touch screen system, or refraining from delivering the command to the commanded system. Using the described touch screen system, the detection of an operator's command and the double check to confirm the command can be accomplished with only a single action by the operator as compared with the three step process discussed above in connection with prior art high integrity touch screen systems.

The term processor, as used herein, includes any data conversion electronics needed to convert the sensor information to be readable by the processor. The use of different processor types for the first and second processors may be used to help to avoid generic errors in the processors. Either or all of the processors may be high integrity self checking processor units. High integrity self checking processor unit consists of two or more processors arranged such that they compare among themselves their operations and results by techniques known to the state of the art, such as comparison of instruction results by instruction results in a synchronized lock step manner or comparing instruction results at other periodic intervals, thus resulting in higher integrity than a single processor can provide yet as a unit appear to the software executing and sensors as a single processor. The term processor, as used herein, also includes any component, device, apparatus and/or machine that is capable of performing a processor function. For example, logic elements such as field programmable gate arrays and logic elements, that do state machines are "processors" as that term is used herein.

A further understanding of the embodiments of the system and method disclosed herein may be obtained through a review of the illustrations accompanying this application together with a review of the detailed description that follows.

With respect to FIG. 1, a non-limiting embodiment of a touch screen system 10 is schematically illustrated. Touch screen system 10 may be employed in any one or more of a wide variety of aviation applications including, but not limited to, air traffic control systems, runway management systems, and aircraft flight control systems. Touch screen system 10 may also be employed in other industries/endeavors including, but not limited to, the medical industry, nuclear power plant management, emergency services, construction and demolition services, space craft operations, fire control systems for military weapons, and in any other industry where the tolerance for error is low.

In the illustrated embodiment, touch screen system 10 includes a display screen 12, a first sensor array 14, a second sensor array 16, a first processor 18, and a second processor 20. Also illustrated in FIG. 1 is commanded system 22 which is communicatively connected to touch screen system 10 and which is configured to receive and respond to commands sent by touch screen system 10. In other embodiments, touch screen system 10 may include one or more additional components. For example, in some non-limiting embodiments, a communication device may be included that is dedicated to communicating with commanded system 22. Such a communication device may be a stand alone component or may be incorporated into any one or more of the other components of touch screen system 10. In other non-limiting embodiments, additional sensor arrays and additional processors may be employed to provide an even higher degree of certainty regarding the location of an operator's touch on display screen 12. As sensor arrays and processors are added to touch screen system 10, the integrity of touch screen system 10 would correspondingly increase. Accordingly, touch screen system 10 may include any suitable number of sensor arrays needed to satisfy any desired integrity for any given application. In other non-limiting embodiments, touch screen system 10 may include one or more data bases or other memory storage components. Such data bases may include information utilized used by the other components of touch screen system 10 to interpret operator inputs into touch screen system 10.

In some non-limiting embodiments, each of the various components of touch screen system 10 may be contained within a single housing and each component may be exclusively dedicated to the operations of touch screen system 10. In other non-limiting embodiments, one or more of the various components of touch screen system 10 may be housed separately from one or more of the other components of touch screen system 10 and may comprise components of other, unrelated systems. Such components may perform functions for both the other, unrelated systems and also for touch screen system 10 without departing from the teachings of the present disclosure.

Display screen 12 may be any type of display device that generates visual output using any one of a number of different technologies. For example, display screen 12 may be a Cathode Ray Tube (CRT) display device, a flat panel display device, a Liquid Crystal Display (LCD) device, a plasma display device, an electro-luminescent display device, a Light Emitting Diode (LED) display device, a holographic display device such as a Head Up Display (HUD), a Micro Mirror Device (MMD) display device, or the like. Additionally, the schematically represented display screen 12 may include multiple individual display screens communicatively connected or otherwise configured to cooperate with one another to enable control of commanded system 22.

As illustrated in FIG. 1, first sensor array 14 is associated with display screen 12. In some embodiments, first sensor array 14 may include multiple sensor elements cooperatively connected and configured to detect a touch by an operator. In other embodiments, first sensor array 14 may include only a single sensor element configured to detect touch by the operator. First sensor array 14 may also include any electronics that enable first sensor array 14 to detect an operator's touch and also to detect the location of such a touch. First sensor array 14 may employ any known or subsequently developed technology for detecting the operator's touch on display screen 12. Known technologies include, but are not limited to, resistive, surface capacitive, projected capacitive, infrared, surface acoustic wave, acoustic pulse recognition, and camera based.

First sensor array 14 may be arranged with respect to display screen 12 in any manner necessary to effectuate the ability of first sensor array 14 to detect an operator's touch. As used herein, the term "touch" shall refer to either physical contact or near physical contact with display screen 12 that is made using either a body part, a stylus, a projector or any other type of pointer or contact device designed and/or configured to trigger a detection by first sensor array 14. In some non-limiting embodiments, first sensor array 14 may be a separate component that is collocated with, or dispose proximate to, display screen 12. In other non-limiting embodiments, first sensor array 14 may be integrated into display screen 12 and may be inseparable therefrom.

First sensor array 14 is further configured to calculate a first set of touch position coordinates 26 in response to detecting the touch by the operator on display screen 12. As used herein, the term "set of touch position coordinates" refers to location information or location data that corresponds to the location on the surface of display screen 12 (e.g. such as the X and Y location on an imaginary X and Y axis overlaid over display screen 12) as observed/detected by first sensor array 14. First sensor array 14 is further configured to generate a signal containing the first set of touch position coordinates 26 in response to detecting the touch of the operator on display screen 12.

In the illustrated embodiment, second sensor array 16 is associated with display screen 12. In some embodiments, second sensor array 16 may include multiple sensor elements cooperatively connected and configured to detect a touch by an operator. In other embodiments, second sensor array 16 may include only a single sensor element configured to detect touch by the operator. Second sensor array 16 may also include any electronics that enable second sensor array 16 to detect an operator's touch and to detect the location of such a touch. As with first sensor array 14, second sensor array 16 may employ any known or subsequently developed technology for detecting the operator's touch on display screen 12. Second sensor array 16 is arranged with respect to display screen 12 in any manner necessary to effectuate the ability of second sensor array 16 to detect the operator's touch, and further, that does not interfere with the ability of first sensor array 14 to detect the operator's touch. In some non-limiting embodiments, second sensor array 16 may be a separate component that is collocated with, or dispose adjacent to, display screen 12. In other embodiments, second sensor array 16 may be integrated into display screen 12 and may be inseparable therefrom.

Second sensor array 16 is further configured to calculate a second set of touch position coordinates 34 in response to detecting the touch of the operator on display screen 12. Second sensor array 16 is further configured to generate a signal containing the second set of touch position coordinates in response to detecting the touch by the operator on display screen 12.

In some embodiments, first sensor array 14 may employ the same touch detection technology as second sensor array 16. For example, first sensor array 14 may employ a surface capacitance technology to detect the touch of an operator on display screen 12 and second sensor array 16 may also employ a surface capacitance technology to detect the touch of an operator on display screen 12. Use of the same technology in each sensor array may simplify the design of touch screen system 10 while still providing the desired high integrity performance. In other embodiments, first sensor array 14 and second sensor array 16 may employ different technologies. For example, first sensor array 14 may employ a surface capacitance technology while second sensor array 16 may employ an infra red detection technology. The use of differing technologies in touch screen system 10 may help to avoid generic errors such as design or production errors that are associated with each specific touch detection technology.

In the illustrated embodiment, first processor 18 is communicatively connected to first sensor array 14. First processor 18 may be any type of computer, computer system, or microprocessor that is configured to perform algorithms, to execute software applications, to execute sub-routines and/or to be loaded with and to execute any other type of computer program. First processor 18 may be connected to first sensor array 14 in any suitable manner including through the use of wires, leads, coaxial cables and/or any other wired connection suitable for conveying a signal. In other non-limiting embodiments, first processor 18 may be connected to first sensor array 14 using a suitable wireless connection, including through the use of radio frequency transmissions, Bluetooth connectivity, infra red transmissions, etc. . . . In the illustrated embodiment, first processor 18 is communicatively connected to first sensor array 14 via cable 24. Cable 24 provides a communicative pathway across which first processor 18 may receive the signal generated by first sensor array 14 containing first set of touch position coordinates 26.

In the illustrated embodiment, second processor 20 is communicatively connected to second sensor array 16. Second processor 20 may be any type of computer, computer system, or microprocessor that is configured to perform algorithms, to execute software applications, to execute sub-routines and/or to be loaded with and to execute any other type of computer program. Second processor 20 may be connected to second sensor array 16 in any suitable manner including through the use of wires, leads, coaxial cables and/or any other wired connection suitable for conveying a signal. In still other non-limiting embodiments, second processor 20 may be connected to second sensor array 16 using a suitable wireless connection, including through the use of radio frequency transmissions, Bluetooth connectivity, infra red transmissions, etc. . . . In the illustrated embodiment, second processor 20 is communicatively connected to second sensor array 16 via cable 32. Cable 32 provides a communicative pathway across which second processor 20 may receive the signal generated by second sensor array 16 containing the second set of touch position coordinates 34.

As will be discussed below, first processor 18 is configured to cooperate with second processor 20 to compare first set of touch position coordinates 26 with second set of touch position coordinates 34. In some embodiments, first processor 18 and second processor 20 may be configured to communicate with a third component, for example, a communication component that is configured to communicate with commanded system 22. In such embodiments, such a communication component may be configured to compare first set of touch position coordinates 26 with second set of touch position coordinates 34. In such embodiments, first processor 18 and second processor 20 need not be communicatively connected to one another. In other embodiments, such as the embodiment illustrated in FIG. 1, each processor is configured to communicate with the other. This configuration enables first processor 18 and second processor 20 to cooperate to compare first set of touch position coordinates 26 with second set of touch position coordinates 34. As illustrated in FIG. 1, first processor 18 and second processor 20 are communicatively connected via cable 36. In other embodiments, any wired or wireless connection effective to convey signals between first processor 18 and second processor 20 may be employed.

When first processor 18 and second processor 20 cooperate to compare first set of touch position coordinates 26 with second set of touch position coordinates 34, one or both processors may compare the two sets of touch position coordinates to determine whether they coincide. As used herein the term "coincide" means that the region of touch represented by each set of touch position coordinates does not differ by more than a predetermined amount. The predetermined amount may vary depending on the information presented on the screen. For instance, if a graphic image is depicted on the screen and presented for selection by an operator, then the predetermined amount may correspond to the size of the graphic image. In this manner, a smaller graphic image will have a smaller predetermined amount while a larger graphic image will have a larger predetermined amount. In other non-limiting embodiments, a specific distance may be set (e.g., a half inch, a quarter inch, three centimeters, etc. . . . ) and any deviation of one set of touch position coordinates from the other that exceeds the specific distance will be deemed to not coincide.

When first set of touch position coordinates 26 and second set of touch position coordinates 34 do not coincide, then the location of the touch on display screen 12 is not confirmed and the touch is invalidated. Accordingly, the requested action either may not be taken or a warning may be issued. For example, an error message may be transmitted to display screen 12 warning the operator of the error. In other examples, the command to commanded system 22 will not be transmitted. In still other examples, touch screen system 10 may automatically initiate a reboot. In still other examples, the icon used to represent an item such as a switch being turned on may not change to an appropriate color or shape for the on state, the commanded system may respond with an error message, the touch screen system may send a default message such as one that places the commanded system into a safe state, or the touch screen system may provide any other numerous responses common to the state of the art when systems do not respond as expected.

In some non-limiting embodiments, first processor 18 may also be communicatively connected to display screen 12. In the illustrated embodiment, first processor 18 is communicatively connected to display screen 12 by cable 28. In other embodiments, any wired or wireless connection effective to convey signals from first processor 18 to display screen 12 may be employed. First processor 18 may be configured to control the information displayed on display screen 12 by sending a signal containing control instructions 30 to display screen 12 across cable 28. Control instructions 30 may relate to the first set of touch position coordinates generated by first sensor array 14. In this manner, an operator presented with information on display screen 12 may provide input into touch screen system 10 by touching display screen 12. That touch is translated by first sensor array 14 into first set of touch position coordinates 26 which is then sent to first processor 18. First processor 18, in turn, interprets input intended by the operator using first set of touch position coordinates 26. In some examples, first processor 18 may use first set of touch position coordinates 26 to retrieve information or control instructions from a data base or storage medium that correspond to the location on display screen 12 indicated by first set of touch position coordinates 26. First processor 18 then generates control instructions 30 and communicates control instructions 30 to display screen 12 to provide information on the display screen. Upon receipt of control instructions 30, display screen 12 then displays new or additional information to the operator. This process repeats each time the operator touches display screen 12. In other embodiments, an independent controller may control display screen 12 and first processor 18 may be configured to provide instructions to display screen 12 through the independent controller.

In other non-limiting embodiments of touch screen system 10 second processor 20 may be configured to determine whether the information displayed on display screen 12 is incorrect. As used herein, the term "incorrect" in conjunction with the information displayed on display screen 12 refers to a situation wherein the information presented on display screen 12 as a result of control instructions 30 sent by first processor 18 differs from information that is determined by second processor 20 to correspond with the second set of touch position coordinates. In the embodiment illustrated in FIG. 1, second processor 20 is communicatively connected to display screen 12 via cable 38 and is further configured to monitor the information displayed on display screen 12. Accordingly, as each touch is registered by second sensor array 16 and converted to a corresponding second set of touch position coordinates 34 and transmitted to second processor 20, second processor 20 is configured to determine the information that corresponds to second set of touch position coordinates 34 and to compare that information with the information actually displayed on display screen 12. In this manner, first processor 18 and second processor 20 cooperate to confirm that the information presented to an operator on display screen 12 actually corresponds to the operator's previous input into display screen 12.

If second processor 20 determines that the information actually displayed on display screen 12 is incorrect, second processor 20 may be configured to take one or more actions to invalidate the touch. For example, second processor 20 may be configured to send a error message or a warning message to commanded system 22 or to display screen 12 or to first processor 18. In another implementation, second processor 20 may be configured to interrupt first processor 18 in the transmission of instructions to commanded system 22 or to another component of touch screen system 10. In still another implementation, second processor 20 may be configured to initiate a reboot of touch screen system 10. In other embodiments, second processor 20 may be configured to take any additional action needed that is consistent with its determination that the information displayed on display screen 12 is incorrect.

With respect to FIGS. 2-6, several non-limiting embodiments illustrating various system configurations for comparing first set of touch position coordinates 26 with second set of touch position coordinates 34 are illustrated. With respect to FIG. 2, second processor 20 is configured to forward second set of touch position coordinates 34 to first processor 18 and first processor 18 is configured to perform the comparison and to invalidate the touch when the two sets of touch position coordinates do not coincide. There are many ways of executing the comparison and processing the results. In some non-limiting implementations, when the first processor determines that first set of touch position coordinates 26 and second set of touch position coordinates 34 coincide, first processor may forward the location of the touch on display screen 12 or instructions corresponding to the location of the touch to commanded system 22. In other implementations, first processor may forward the location of the touch on display screen 12 or corresponding instructions to an intervening communication component or other system component.

If, as a result of the comparison, first processor 18 determines that the two sets of touch position coordinates do not coincide, then first processor 18 may be configured to take one of several actions. In some implementations, first processor 18 may be configured to refrain from forwarding the location of the touch to commanded system 22. In other implementations, first processor 18 may be configured to forward the touch location to commanded system 22 together with a warning to the effect that the results are not confirmed. In other implementations, first processor 18 may be configured to initiate a shut down or a reboot of touch screen system 10. In still other implementations, first processor 18 may be configured to send a message to display screen 12 requesting that the operator re-enter the input or requesting the operator to initiate a reboot of touch screen system 10. In still other implementations, first processor 18 may be configured to take any other action consistent with receiving inconsistent sets of touch position coordinates.

Figure 2:
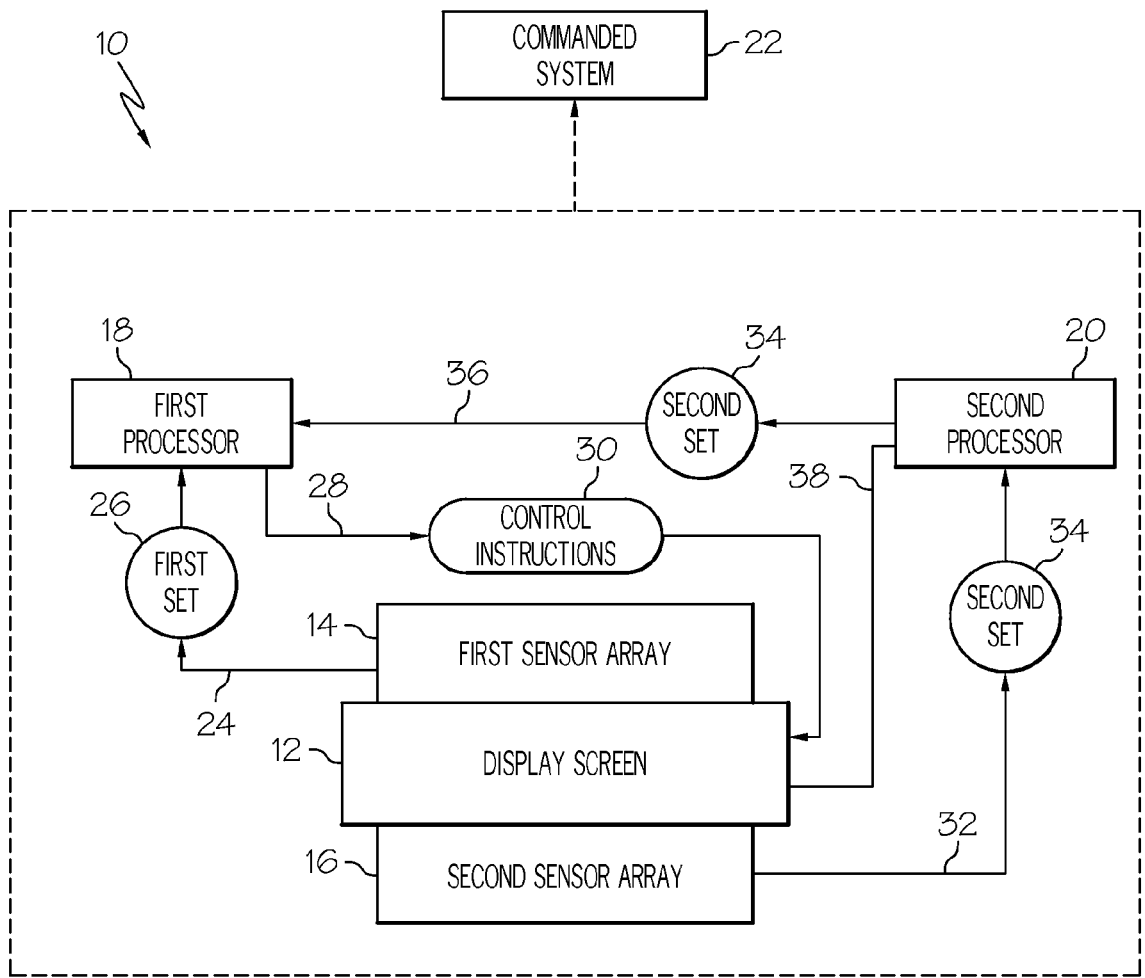
FIGS. 2-6 are schematic illustrations of various non-limiting implementations of the touch screen system of FIG. 1, depicting various strategies for comparing differing sets of touch position coordinates.
Figure 3:
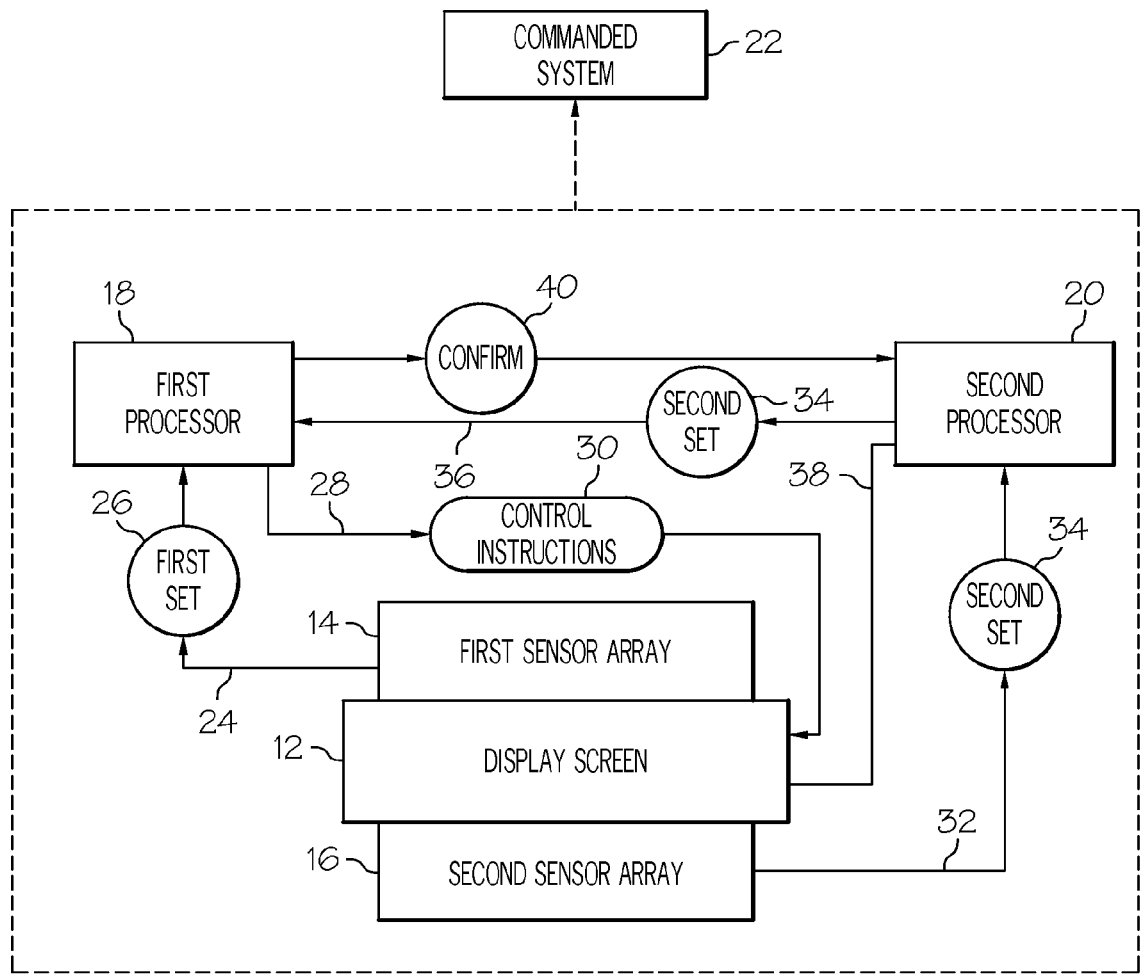

With respect to FIG. 3, a variation of the implementation illustrated in FIG. 2 is depicted. First processor 18 is further configured to provide a confirmation message to second processor 20 when the first set of touch position coordinates 26 and second set of touch position coordinates 34 coincide. In the implementation of FIG. 3, second processor 20 is configured to forward second set of touch position coordinates 34 to another component only upon receipt of confirmation message 40. In some implementations, second processor 20 may forward second set of touch position coordinates to commanded system 22 after receiving confirmation message 40 from first processor 18. In other implementations, second processor 20 may forward second set of touch position coordinates 34 to another component, such as a communication component that is configured to communicate with commanded system 22. In instances where first processor 18 determines that the two sets of touch position coordinates do not coincide and does not transmit confirmation message 40, second processor 20 will not forward second set of touch position coordinates 34 to commanded system 22 or to any other components.

Figure 4:
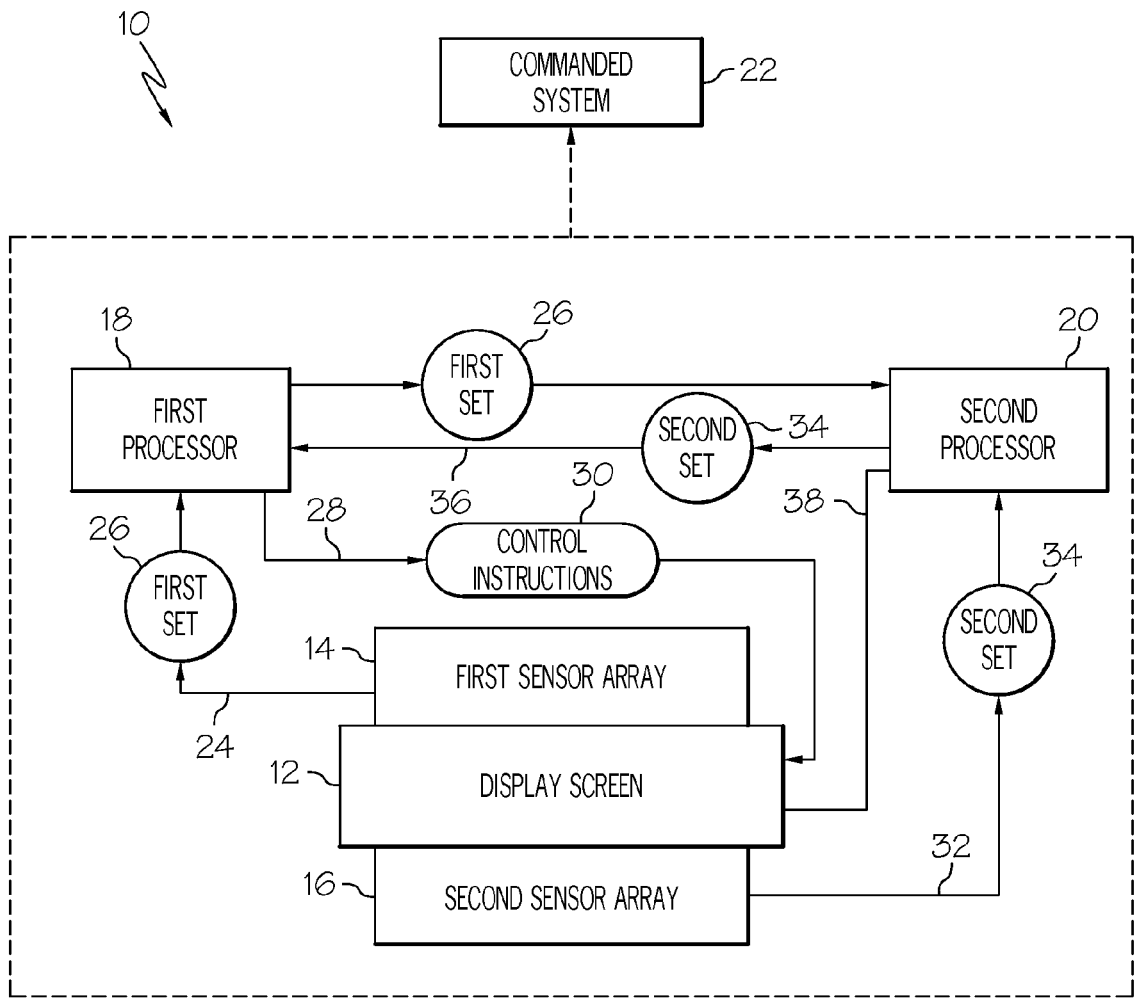

With respect to FIG. 4, another variation of the implementation illustrated in FIG. 2 is depicted. In FIG. 4, second processor 20 is configured to forward second set of touch position coordinates 34 to first processor 18. First processor 18 is likewise configured to provide first set of touch position coordinates 26 to second processor 20. Both first processor 18 and second processor 20 are each configured to perform the comparison. First processor 18 and second processor 20 are each configured to forward respective touch position coordinates to either commanded system 22, to another component, or both, when each processor determines that the two sets of touch position coordinates coincide. In this implementation, either first processor 18 or second processor 20 may invalidate the touch if either processor determines that the two sets of touch position coordinates do not coincide.

Figure 5:
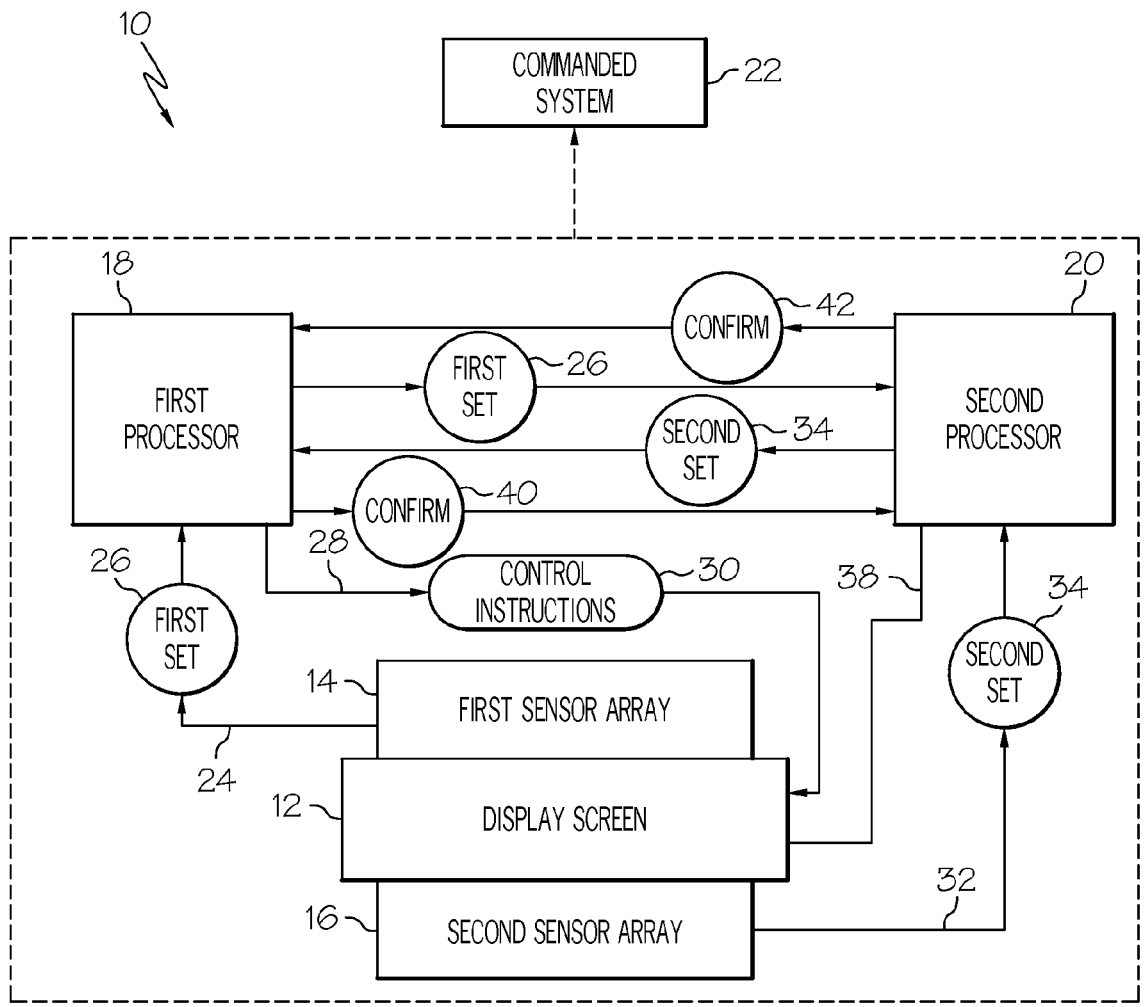

With respect to FIG. 5, yet another variation of the implementation illustrated in FIG. 2 is depicted. In this implementation, first processor 18 and second processor 20 are each configured to perform the comparison. Second processor 20 is configured to provide second set of touch position coordinates 34 to first processor 18 and first processor 18 is configured to provide first set of touch position coordinates 26 to second processor 20. First processor 18 is configured to compare the two sets of touch position coordinates and to transmit confirmation message 40 when first processor 18 determines that the two sets of touch position coordinates coincide. Similarly, second processor 20 is configured to compare the two sets of touch position coordinates and to transmit a confirmation message 42 when second processor 20 determines the two sets of touch position coordinates coincide. Further, first processor 18 and second processor 20 are each configured to refrain from forwarding touch position coordinates to either commanded system 22 or another component until the respective confirmation message is received. First processor 18 and second processor 20 are each further configured to invalidate the touch after determining that the two sets of touch position coordinates do not coincide.

Figure 6:
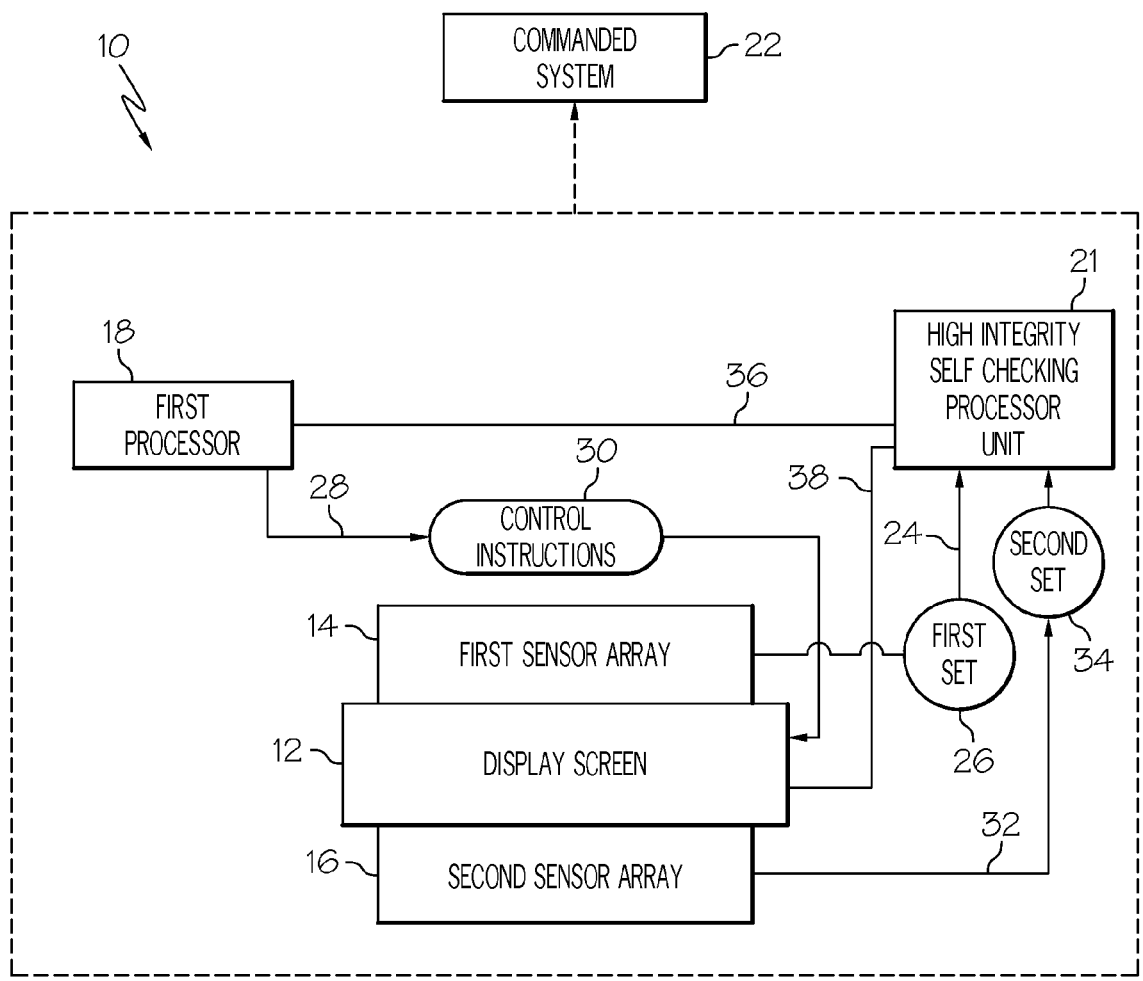

With respect to FIG. 6, another implementation is illustrated wherein one of the two independent processors (first processor 18 and second processor 20) that were used for comparison of sensor inputs in the preceding variations is replaced by a single high integrity self checking processor unit 21, such as exists in the state of the art. High integrity self checking processor unit 21 includes two processors that are configured to operate in lockstep to compare instruction by instruction to ensure the integrity of the processors so they can operate and appear to software and to the sensors as a single processor. In the embodiment illustrated in FIG. 6, first processor 18 is retained for the purpose of providing control instructions to display screen 12. In other implementations utilizing high integrity self checking processor unit 21, first processor 18 may be eliminated and control instructions 30 may be provided by high integrity self checking processor unit 21 which consists of two or more processors providing comparisons or by any other suitable controller.

In the implementation illustrated in FIG. 6, once a touch is applied to display screen 12, first sensor array 14 will generate first set of touch position coordinates 26, and will provide first set of touch position coordinates 26 to high integrity self checking processor unit 21. Second sensor array 16 will generate second set of touch position coordinates 34 and will provide second set of touch position coordinates 34 to high integrity self checking processor unit 21. High integrity self checking processor unit will then compare first set of touch position coordinates 26 with second set of touch position coordinates 34, and is configured to invalidate the touch when first set of touch position coordinates 26 and second set of touch position coordinates 34 do not substantially coincide. As discussed below, high integrity processor unit 21 may be further configured to invalidate the touch when it determines that the information presented to the operator on display screen 12, such as a simulated switch position shape and/or color, is incorrect.

Figure 7:
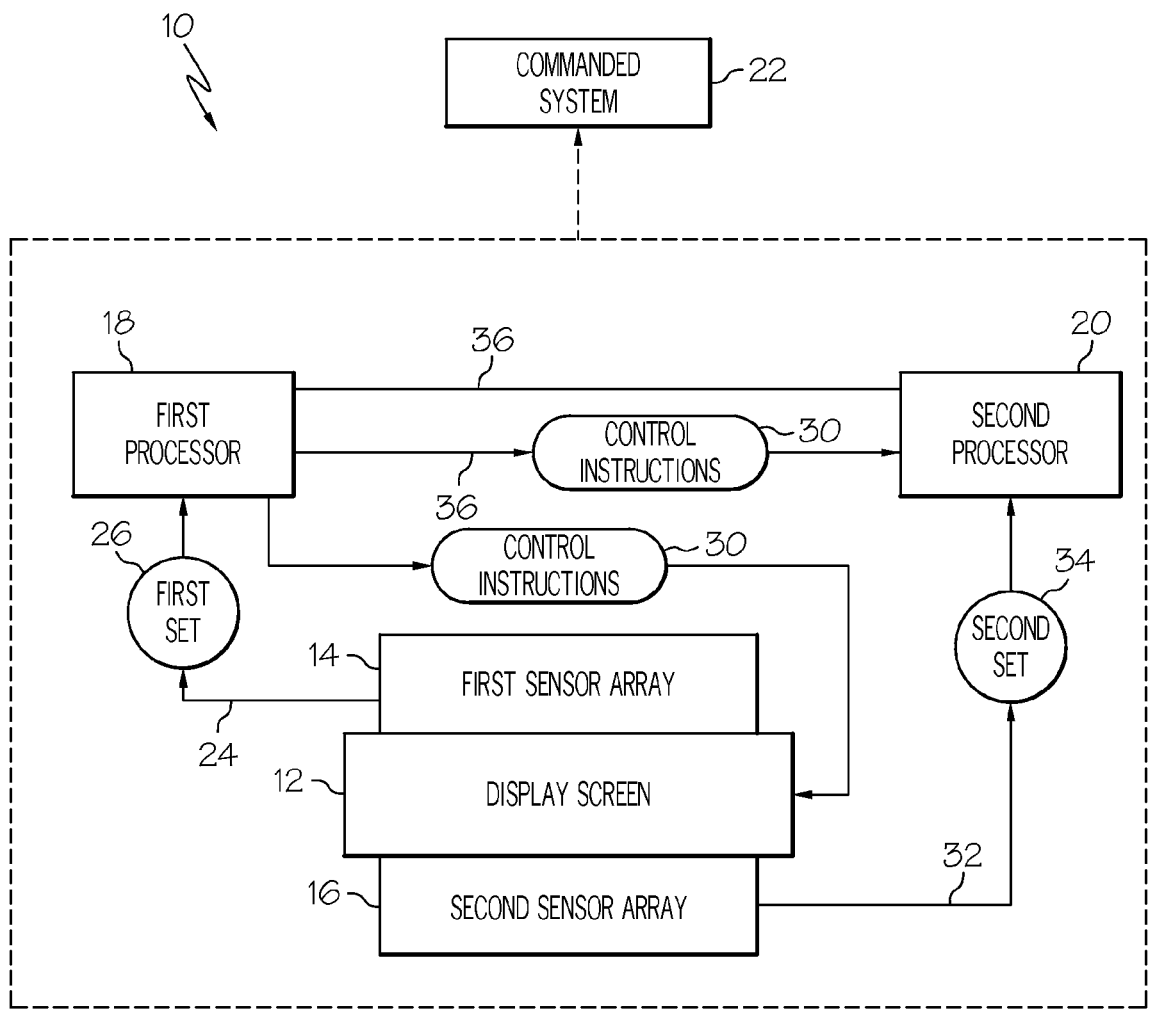
FIG. 7 is a schematic illustration depicting an implementation of the touch screen system of FIG. 1 configured to verify information presented to an operator on a display screen.

With respect to FIG. 7, another implementation of touch screen system 10 is illustrated. In this implementation, in addition to being configured to send control instructions 30 to display screen to control the information presented to an operator, first processor 18 is further configured to provide control instructions 30 directly to second processor 20. Second processor 20 is configured to utilize control instructions 30 to determine whether the information displayed on display screen 12 is correct. If second processor 20 determines that the information displayed on display screen 12 is incorrect, then second processor 20 may be configured to take any of the invalidating measures discussed above.

In implementations of touch screen system 10, such as that shown and described in FIG. 6, wherein a single high integrity self checking processor unit receives both sets of sensor data and performs the comparison to determine if the positions coincide, the single high integrity self checking processor unit may also determine whether control instructions 30 sent from first processor 18 to display screen 12 is correct by monitoring both control instructions 30 (which may be transmitted via cable 36) and also data from display screen 12 via cable 38. In such implementations, the functions of first processor 18 may be restricted to provide only control instructions 30 to display screen 12. In a variation, first processor 18 can be eliminated entirely and the single high integrity self checking processor unit can provides control instructions 30 to the display.

Figure 8:
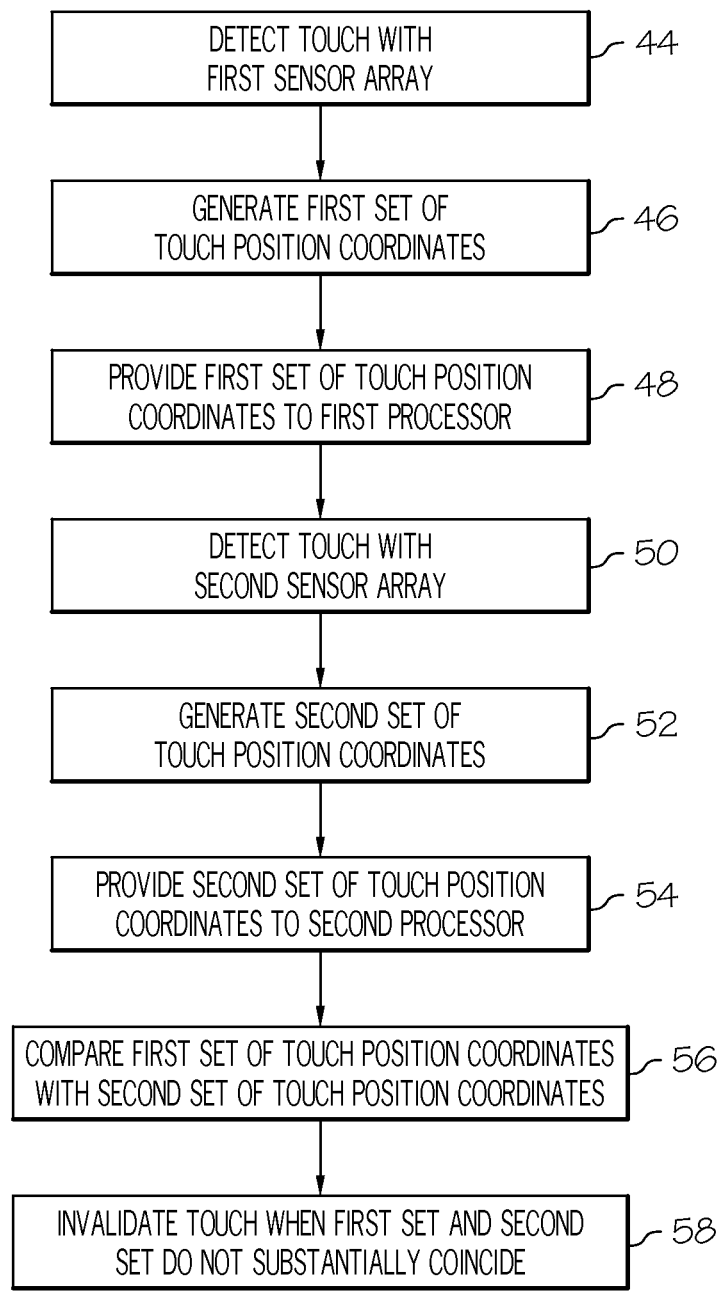
FIG. 8 is a block diagram illustrating various steps of a method for detecting a touch using a high integrity touch screen system.

With respect to FIG. 8, a block diagram is presented illustrating various steps of a method for detecting a touch using touch screen system 10. At block 44, an operator's touch on display screen 12 is detected by first sensor array 14. First sensor array 14 may utilize any of the touch detection technologies described above.

At block 46, first sensor array 14 generates first set of touch position coordinates 26. First sensor array 14 may utilize inherent electronics or other components to generate first set of touch position coordinates 26.

At block 48, first sensor array 14 provides first set of touch position coordinates 26 to first processor 18. This communication may be made over any suitable wired or wireless connection.

At block 50, the operator's touch on display screen 12 is detected by second sensor array 16. Second sensor array 16 may utilize any of the touch detection technologies described above. This detection by second sensor array 16 may occur substantially simultaneously with the detection of the touch by first sensor array 14, or may be delayed by some period of time depending on the technologies employed. Second sensor array 16 may employ the same touch detection technology as is employed by first sensor array 14 or a different technology, as desired.

At block 52, second sensor array 16 generates second set of touch position coordinates 34. Second sensor array 16 may utilize inherent electronics or other components to generate second set of touch position coordinates 34.

At block 54, second sensor array 16 provides second set of touch position coordinates 34 to second processor 20. This communication may be made over any suitable wired or wireless connection.

At block 56, first set of touch position coordinates 26 and second set of touch position coordinates 34 are compared. In some implementations, this comparison may be accomplished using only one of the first processor 18 or the second processor 20, while in other implementations, both first processor 18 and second processor 20 may conduct the comparison.

At block 58, the touch on touch screen 12 is invalidated when the comparison at block 56 reveals that first set of touch position coordinates 26 and second set of touch position coordinates 34 do not coincide.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A high integrity touch screen system comprising:
a display screen configured to present information to an operator;

a first sensor array arranged proximate the display screen, the first sensor array configured to detect a touch by the operator on the display screen and to generate a first set of touch position coordinates;

a first processor communicatively connected to the first sensor array and to the display screen, the first processor configured to receive the first set of touch position coordinates from the first sensor array and to control the information presented to the operator on the display screen utilizing the first set of touch position coordinates;

a second sensor array arranged proximate the display screen, the second sensor array configured to detect the touch by the operator on the display screen and to generate a second set of touch position coordinates; and a second processor communicatively connected to the second sensor array and to the display screen, the second processor configured to receive the second set of touch position coordinates from the second sensor array and to monitor the information presented to the operator on the display screen, wherein the first processor and the second processor are communicatively connected to each other, wherein the first processor and the second processor are further configured to cooperate to compare the first set of touch position coordinates with the second set of touch position coordinates and to invalidate the touch when the first set of touch position coordinates and the second set of touch position coordinates do not substantially coincide, and wherein the second processor is still further configured to make a determination that that the information presented to the operator on the display screen is incorrect based on the second set of touch position coordinates and invalidate the touch based on the determination.

2. The high integrity touch screen system of claim 1, wherein the second processor is configured to monitor the display screen to determine that the information presented to the operator on the display screen is incorrect.

3. The high integrity touch screen system of claim 1, wherein the second processor is configured to monitor instructions sent to the display screen by the first processor to determine that the information presented to the operator on the display screen is incorrect.

4. The high integrity touch screen system of claim 1, wherein the second processor is configured to provide the second set of touch position coordinates to the first processor, and wherein the first processor is configured to compare the first set of touch position coordinates to the second set of touch position coordinates and to invalidate the touch when the first set of touch position coordinates and the second set of touch position coordinates do not substantially coincide.

5. The high integrity touch screen system of claim 4, wherein the first processor is further configured to provide the second processor with a confirmation when the first processor determines that the first set of touch position coordinates and the second set of touch position coordinates substantially coincide.

6. The high integrity touch screen system of claim 4, wherein the first processor is configured to provide the first set of touch position coordinates to the second processor, and wherein the second processor is configured to compare the second set of touch position coordinates to the first set of touch position coordinates, and to invalidate the touch when the second set of touch position coordinates and the first set of touch position coordinates do not substantially coincide.

7. The high integrity touch screen system of claim 6 wherein the first processor is configured to provide the second processor with a confirmation when the first processor determines that the first set of touch position coordinates and the second set of touch position coordinates substantially coincide, and wherein the second processor is configured to provide the first processor with a confirmation when the second processor determines that the second set of touch position coordinates and the first set of touch position coordinates substantially coincide.

8. The high integrity touch screen system of claim 1, wherein the first sensor array utilizes a first touch screen technology and wherein the second sensor array also utilizes the first touch screen technology.

9. The high integrity touch screen system of claim 1, wherein the first sensor array utilizes a first touch screen technology and wherein the second sensor array utilizes a second touch screen technology.

10. A method of detecting a touch on a high integrity touch screen system, the method comprising the steps of:

detecting the touch on a display screen with a first sensor array;

generating a first set of touch position coordinates with the first sensor array;

providing the first set of touch position coordinates to a first processor;

controlling information presented to the operator on the display screen utilizing the first set of touch position coordinates;

detecting the touch on the display screen with a second sensor array;

generating a second set of touch position coordinates with the second sensor array;

providing the second set of touch position coordinates to a second processor;

comparing the first set of touch position coordinates with the second set of touch position coordinates;

invalidating the touch when the first set of touch position coordinates and the second set of touch position coordinates do not substantially coincide;

determining that the information presented to the operator on the display screen is incorrect by the second processor based on the second set of touch position coordinates; and invalidating the touch based on the determining.

11. The method of claim 10, wherein the step of detecting the touch on the display screen with the first sensor array comprises using a first technology to detect a location of the touch, and wherein the step of detecting the touch on the display screen with the second sensor array comprises using a second technology to detect the location of the touch.

12. The method of claim 10, wherein the comparing step comprises utilizing only the first processor to compare the first set of touch position coordinates with the second set of touch position coordinates.

13. The method of claim 10, wherein the comparing step comprises utilizing both the first processor and the second processor to compare the first set of touch position coordinates with the second set of touch position coordinates.

* * * * *

UNITED STATES PATENT AND TRADEMARK OFFICE
CERTIFICATE OF CORRECTION

PATENT NO.       : 8,896,546 B2                                       Page 1 of 1
APPLICATION NO.  : 12/695798
DATED            : November 25, 2014
INVENTOR(S)      : Grothe et al.

It is certified that error appears in the above-identified patent and that said Letters Patent is hereby corrected as shown below:

In the claims

Column 15, line 31, "that that" should be changed to --that--.

Signed and Sealed this
Twenty-second Day of March, 2016

Michelle K. Lee
*Director of the United States Patent and Trademark Office*